US005767395A

United States Patent [19]

Goto et al.

[11] Patent Number: 5,767,395

[45] Date of Patent: Jun. 16, 1998

[54] FUNCTION DIAGNOSIS APPARATUS FOR EVAPORATIVE EMISSION CONTROL SYSTEM

[75] Inventors: Kenichi Goto, Zama; Atsushi Iochi, Machida; Hiroshi Kuriki, Yokohama, all of Japan

[73] Assignee: Nissan Motor Co., Ltd., Kanagawa, Japan

[21] Appl. No.: 682,821

[22] Filed: Jul. 12, 1996

[30] Foreign Application Priority Data

Jul. 14, 1995 [JP] Japan .................................... 7-178316

[51] Int. Cl.$^6$ .................................................. G01M 15/00

[52] U.S. Cl. ............................................ 73/118.1; 123/520

[58] Field of Search ................................ 73/39, 47, 49.7, 73/117.2, 118.1; 123/520

[56] References Cited

U.S. PATENT DOCUMENTS

| | | | |
|---|---|---|---|
| 5,150,689 | 9/1992 | Yano et al. | 73/118.1 |
| 5,197,442 | 3/1993 | Blumenstock et al. | 123/520 |
| 5,251,477 | 10/1993 | Nakashima et al. | 73/118.1 |
| 5,275,144 | 1/1994 | Gross | 73/118.1 |
| 5,284,050 | 2/1994 | Iida et al. | 73/118.1 |
| 5,363,828 | 11/1994 | Yamashita et al. | 123/520 |
| 5,427,075 | 6/1995 | Yamanaka et al. | 123/520 |
| 5,441,031 | 8/1995 | Kiyomiya et al. | 123/520 |
| 5,448,980 | 9/1995 | Kawamura et al. | 123/520 |
| 5,450,834 | 9/1995 | Yamanaka et al. | 123/520 |
| 5,479,905 | 1/1996 | Ito | 123/520 |
| 5,494,021 | 2/1996 | Yoneyama | 123/520 |
| 5,495,842 | 3/1996 | Yamanaka et al. | 123/520 |
| 5,497,754 | 3/1996 | Ito | 123/520 |
| 5,501,199 | 3/1996 | Yoneyama | 123/520 |
| 5,560,243 | 10/1996 | Wild | 73/118.1 |
| 5,614,665 | 3/1997 | Curran et al. | 73/118.1 |

FOREIGN PATENT DOCUMENTS

| | | |
|---|---|---|
| 4-311664 | 11/1992 | Japan . |
| 5-39754 | 2/1993 | Japan . |

*Primary Examiner*—George M. Dombroske
*Assistant Examiner*—Eric S. McCall
*Attorney, Agent, or Firm*—Lowe, Price, LeBlanc & Becker

[57] ABSTRACT

A function diagnosing apparatus of an evaporative emission control system for an automotive vehicle executes a diagnosis when a diagnosis starting condition is satisfied. First, a purge cut valve and a vent cut valve are closed, and a bypass valve for a one way valve disposed between a fuel tank and a canister is opened. When a pressure in a purging line is not raised up by these valve operations, it is decided that the system goes wrong due to one of of the bypass valve in a cold condition, fuel vapor leakage, of the vent cut valve in an open condition, and/or no vapor existence. Upon opening the vent cut valve, it is decided as to whether the purge line pressure is dropped or not. When the purge line pressure is dropped, it is decided that the vent cut valve is normal. When the purge line pressure is not dropped, it is decided that vent cut valve is sticking closed.

8 Claims, 3 Drawing Sheets

FUNCTION DIAGNOSIS APPARATUS FOR EVAPORATIVE EMISSION CONTROL SYSTEM

BACKGROUND OF THE INVENTION

1. Field of the Invention

The present invention relates to an evaporative emission control system for an internal combustion system, and more particularly to a valve function diagnosis apparatus applied to an evaporative fuel leakage diagnosis.

2. Description of the Prior Art

A variety of evaporative emission control systems for automotive vehicles have been proposed and in practical use. A typical evaporative emission control system is provided with a charcoal canister for preventing evaporative fuel in a fuel tank from being purged into the atmosphere. In such an evaporative emission control system, the charcoal canister adsorbs evaporative fuel from the fuel tank and purges the same into the engine by utilizing the negative pressure generated by the internal combustion engine. Such evaporative emission control systems have been required to accurately diagnose the leakage condition of the evaporative emission control system. In order to meet with such requirement, Japanese Patent Provisional Publication No. 5-39764 proposes an evaporative emission control system including a function diagnosis means in which a purge control valve (purge cut valve) is disposed in a passage between a canister and an intake passage, a fresh air control valve (vent cut valve) is disposed at a fresh air inlet of the canister, and a pressure sensor is disposed in the passage between the canister and the purge cut valve. The function diagnosis means diagnoses the function of the evaporative emission control system on the basis of pressure valves in a condition that both of the purge control valve and the fresh air control valve are closed and in a condition that both of them are opened. When the line pressure is radically decreased by forcibly closing the fresh air control valve during a purging operation, it is decided that the fresh air control valve is normal. When it is not changed, it is decided that the fresh air control valve is abnormal.

However, such a system has a possibility that the line of the system may be deformed by the radical decrease of the line pressure. Further, since this conventional apparatus diagnoses the sealing ability of a long line including the fuel tank and the canister, it is difficult to accurately diagnose the function of the fresh air control valve.

SUMMARY OF THE INVENTION

It is an object of the present invention to provide an improved valve-function diagnosing apparatus of the evaporative emission control system for an automotive vehicle, which apparatus accurately diagnoses a function of a fresh air control valve of a canister while preventing the line of the apparatus from receiving excessive pressure load.

A function diagnosis apparatus according to the present invention diagnoses an evaporative emission control system for an internal combustion engine. The apparatus comprises a passage which fluidly communicates a fuel tank and an intake passage of the internal combustion engine. A canister is disposed in the passage and adsorbs fuel vapor generated in the fuel tank. A purge cut valve is disposed in the passage between the canister and the intake passage. The purge cut valve closes and opens the passage. A vent cut valve is connected to a fresh air inlet port of the canister. A one way valve is disposed in the passage between the fuel tank and the canister so as to prevent negative pressure of the intake passage from being supplied to the fuel tank and allow the fuel vapor to flow to the canister. A bypass valve is connected to the passage between the fuel tank and the canister through a bypass passage so as to bypass the one way valve. A valve control means controls open-and-close operations of the purge cut valve, the vent cut valve and the bypass valve. A pressure detecting means detects pressure in the passage between the purge cut valve and the canister. A diagnosing means diagnoses function of the vent cut valve on the basis of the pressure value detected by the pressure detecting means in a condition that the passage between the canister and the intake passage and the fresh air passage are closed by closing the purge cut valve and the vent cut valve and in a condition that the bypass passage is temporally opened by opening the bypass valve.

DETAILED DESCRIPTION OF THE INVENTION

Figure 1:
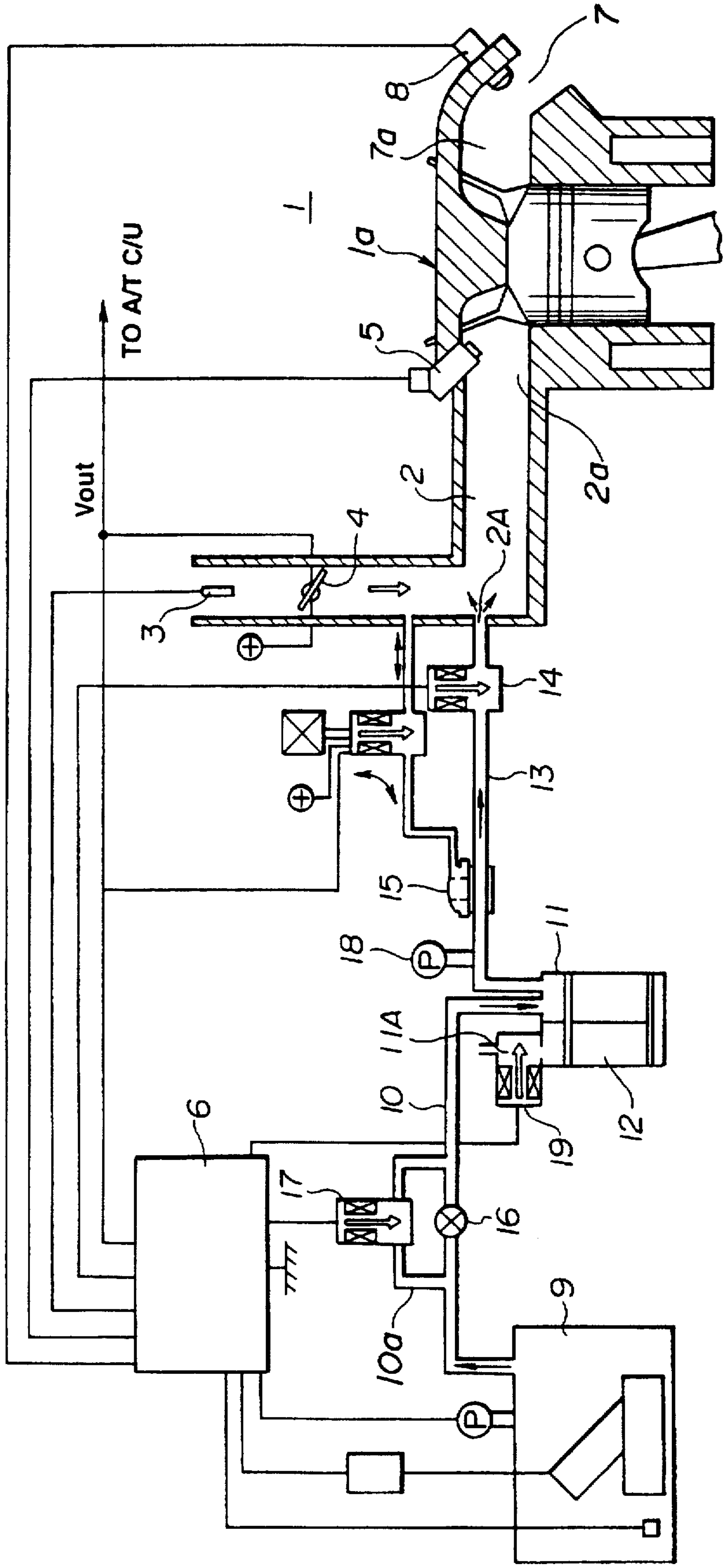
FIG. 1 is a view which shows an embodiment of a diagnosis apparatus for an evaporative emission control system for an automotive vehicle in accordance with the present invention.
Figure 2:
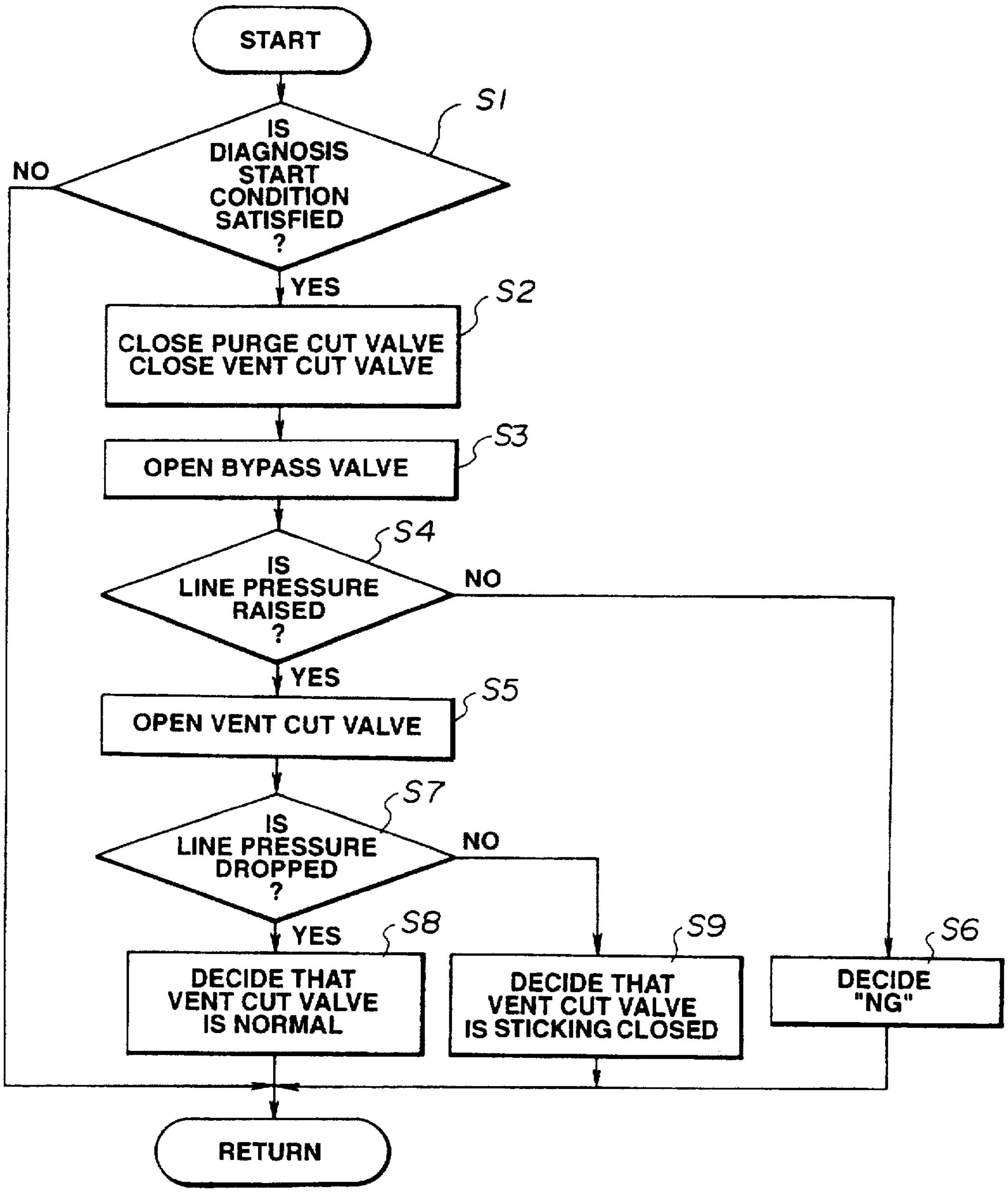
FIG. 2 is a flowchart which shows a control procedure of the embodiment of FIG. 1.
Figure 3:
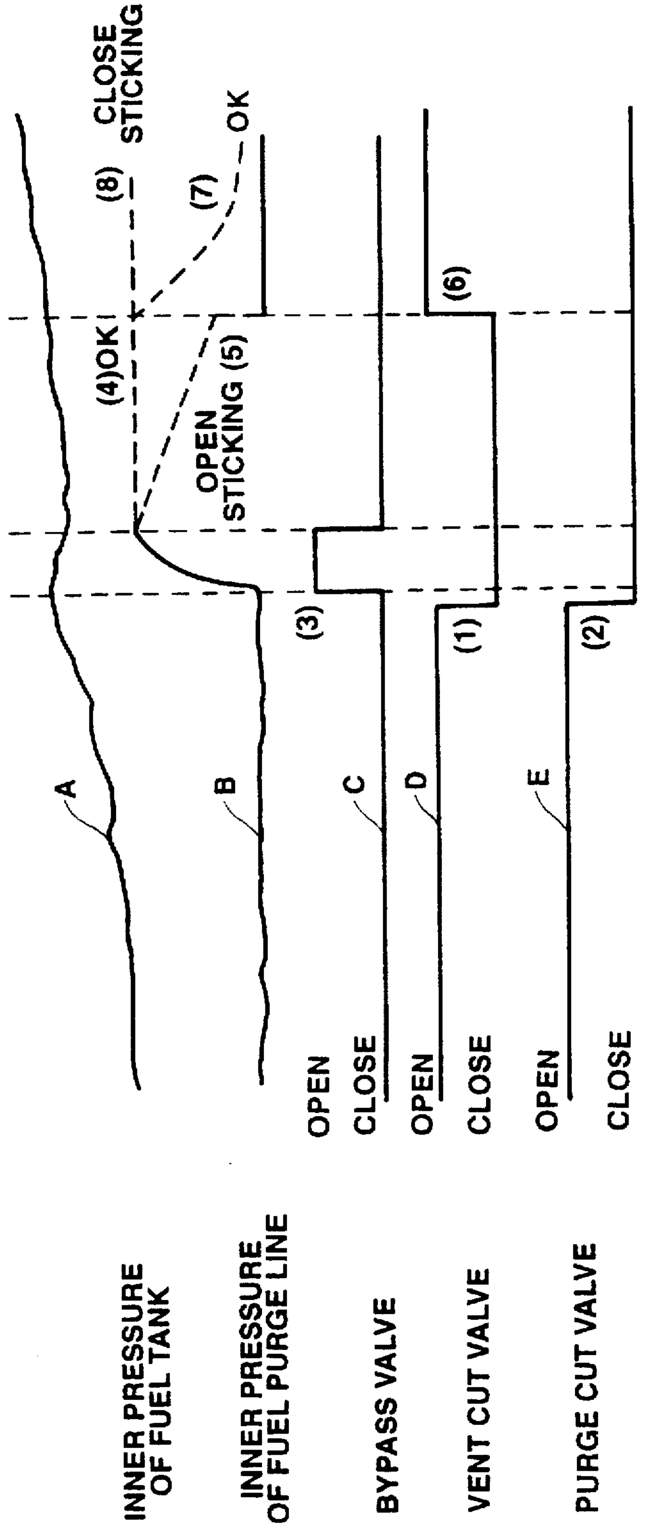
FIG. 3 is a timechart which shows operating conditions of elements of the diagnosis apparatus.

Referring to FIGS. 1 to 3, there is shown an embodiment of a function diagnosis apparatus of an evaporative emission control system for an internal combustion engine system in accordance with the present invention.

As shown in FIG. 1, an internal combustion engine 1 of an automotive vehicle has an intake passage 2 including an intake manifold 2*a* and an exhaust passage 7 including an exhaust manifold 7*a*. Disposed in the intake passage 2 are an air flow meter 3 for detecting a flow rate of intake air and a throttle valve 4 for controlling the flow rate of the intake air according to a depressed degree of an acceleration pedal (not shown). A plurality of fuel injectors 5 of electromagnetic type are disposed in the intake manifold 2*a* connected with an engine block 1*a* and function as a fuel supply means for cylinders of the engine 1. The fuel injector 5 injects a predetermined amount of fuel according to an injection pulse signal from a control unit 6 which includes a microcomputer to supply fuel to each cylinder. In the exhaust passage 7, an air-fuel ratio sensor (O2 sensor) 8 is disposed and functions as a means for detecting an air-fuel ratio by detecting an oxygen density in the exhaust gases in the exhaust manifold 7*a*.

Fuel vapor accumulated in an upper space of the fuel tank 9 is led to a canister 11 through a fuel vapor passage 10 during a stop of the engine 1 and is temporally adsorbed to an adsorbent such as activated carbon in the canister 11. A space portion formed at an upper portion of the canister 11 is communicated with a purge port 2A formed in the intake passage 2 downstream of the throttle valve 4 through a purging passage 13.

The canister 11 further includes a fresh air passage 11A and a fresh air control valve (vent cut valve) 19 disposed in the fresh air passage 11A. The vent cut valve 19 functions as a fresh air control valve during an evaporative fuel-leak diagnosis. The vent cut valve 19 is opened when a normal purge control of the evaporative emission control system is executed, and is operated into open and closed conditions when the leak diagnosis is executed.

The purging passage 13 is provided with a purge control valve 14 which is controlled by the control unit 6 and a purge cut valve 15 functioning as a purge controlling means. The purge control valve 14 is a valve of a stepping motor control type and controls a purge amount of the fuel vapor stored in the canister 11 by changing an opening degree of a passage. That is, the purge control valve 14 is controlled to adjust the purge amount according to the intake air amount (the flow rate of the intake air). For example, when the engine 1 is operated in low-load and low rotation speed, an opening degree of the purge control valve 14 is set small. When it is in high-load and high rotation speed, the opening degree of the purge control valve 14 is set large.

The purge cut valve 15 is an ON-OFF valve for cutting the purging of the fuel vapor. The purge cut valve 15 is closed when the throttle valve 4 is fully closed, and is opened when the throttle valve 4 is opened. The purge cut valve 15 is installed in order to improve the reliability of the system, that is, function as a counterplan executing means when the purge control valve 14 is left open, although the purging can be cut by the purge control valve 14.

A negative pressure cut valve 16 is disposed in the fuel vapor passage 10 between the fuel tank 9 and the canister 11, and a bypass valve 17 is disposed so as to bypass the negative pressure cut valve 16 through a bypass passage 10*a*. The negative pressure cut valve 16 is a one way valve for preventing the negative pressure of the intake manifold 1*a* from being supplied to the fuel tank 9 and for allowing the fuel vapor to flow toward the canister 11. The bypass valve 17 is used in the evaporative fuel leakage diagnosis, and is normally kept in a closed condition. The bypass valve 17 is opened to lead the positive pressure of the fuel tank 9 to the purging passage 13. A purge line pressure sensor 18 functioning as a pressure detecting means is disposed in the purging passage 13 between the canister 11 and the purge cut valve 15, and outputs a detection signal indicative of a pressure in the purging passage 13 to the control unit 6.

An air-fuel ratio feedback control system is constituted by sensors for detecting an operating condition of the engine 1 such as the air-flow meter 3 and a crankangle sensor (not-shown), the $O_2$ sensor 8 for detecting the air-fuel ratio of the engine 1, the fuel injector 5, and an air-fuel ratio feed back control means which decides as to whether the engine 1 is in an air-fuel ratio feedback control range or not, in accordance with the signals from the above mentioned sensors and controls the fuel injection amount at the fuel injector 5 so that the actual air-fuel ratio corresponds to a target air-fuel ratio when it is decided that the engine is in the air-fuel ratio feedback control range. Further, the evaporative emission control system is constituted by a canister 11, the purging passage 13, the purge control valve 14, and a purge control means which calculates the opening degree of the purge control valve 14 according to the engine operating condition and outputs a command to the purge control valve 14. This purge control means is installed in the control unit 6 in the form of a software.

The control unit 6 includes a first diagnosis means, a second diagnosis means and a valve control means for controlling the purge cut valve 15, the negative pressure cut valve bypass valve 17 and the vent cut valve 19.

The manner of operation of the diagnosing apparatus according to the present invention will be discussed. First, with reference to a flowchart of FIG. 2, a valve control function and a diagnosing function executed by the control unit 6 will be discussed.

At a step S1, it is decided as to whether a diagnosis starting condition is satisfied or not, that is, it is decided as to whether the following conditions are satisfied or not:

(1) during a purge cut condition;

(2) water temperature TWN is within a range 70° C.<TWN<100° C.;

(3) engine rotation speed MNRPM is within a range 550 rpm≦MNRPM≦1800 rpm;

(4) fuel injection pulse width Tp is within a range 0 ms≦Tp<5 ms;

(5) vehicle speed VSP is within a range 0 km/h≦VSP<20 km/h; and (6) a correction coefficient of the air-fuel ratio feedback is deviated small and is generally kept at 100%.

When it is decided that the system is in a diagnosis starting condition, the routine proceeds to a step S2. When the system is not in the diagnosis starting condition, the routine repeats the step S1.

At the step S2, both of the purge cut valve 15 and the vent cut valve 19 are closed.

At a step S3, the bypass valve 17 is opened.

At a step S4, it is decided as to whether a pressure in the purge line, which is detected by the purge line pressure sensor 18, is raised up or not. When the purge line pressure is raised up, the routine proceeds to a step S5. When the purge line pressure is not raised up, the routine proceeds to a step S6 wherein it is decided that the system goes trouble such as sticking of the bypass valve 17 in a closed condition, a leakage of evaporative emission, sticking of the vent cut valve 19 in an open condition, or no fuel vapor existence. Following this, the routine returns to the step S1.

At the step S5, the vent cut valve 19 is opened. Following this, the routine proceeds to a step S7 wherein it is decided as to whether the purge line pressure is dropped or not. When the purge line pressure is dropped, the routine proceeds to a step S8. When it has not dropped, the routine proceeds to a step S9. That is, if the purge line pressure is dropped by opening the vent cut valve 19, it means that the vent cut valve 19 is normally operated. Therefore, the routine proceeds to the step S8 wherein it is decided that the vent cut value 19 is normal. Then, the routine returns to the step S1. On the other hand, if the purge line pressure is not dropped even if the opening operation of the vent-cut valve 19 is executed, it means that the vent cut valve 19 is in a close sticking condition. Therefore, the routine proceeds to the step S9 wherein it is decided that the vent cut valve 19 is in a stick closed condition. Then, the routine returns to the step S1.

In this flowchart, the step S4 corresponds to a first diagnosis means, and the step S7 corresponds to a second diagnosis means.

Further detailed explanation as to the operation of the flowchart of FIG. 2 will be discussed hereinafter with reference to a timechart of FIG. 3.

In FIG. 3, a line (A) denotes a change of an inner pressure of the fuel tank 9, a line (B) denotes a change of an inner pressure of the purging passage 13, a line (C) denotes an opening condition of the bypass valve 17 as to the negative pressure valve 16, and a line (E) denotes an opening condition of the purge cut valve 15. When the line pressure is not raised up by closing the vent cut valve 19 and the purge cut valve 15 as shown at a position (1) and a position (2) of FIG. 3 and by opening the bypass valve 17 as shown at a position (3) of FIG. 3, there is a possibility that the vent cut valve 19 is in a sticking closed condition. In contrast, when the line pressure is raised up as shown at a position (4)

of FIG. 3, there is no possibility of the of the vent cut valve 19 sticking closed, and therefore preliminarily it is decided that the vent cut valve 19 is normal.

When the line pressure is not raised up and is dropped as shown at a position (7) of FIG. 3 after the opening of the vent cut valve 19 as shown at a position (6) of FIG. 3, it is decided that the vent cut valve 19 is normal. If the line pressure is not dropped by the opening of the vent cut valve 19, it is decided that the vent cut valve 19 is in a sticking closed condition.

With the thus arranged apparatus, it becomes possible to easily and firmly execute a function diagnosis of the vent cut valve 19. Particularly, since the positive pressure diagnosis utilizing the purging of the fuel tank 9 is executed, that is, since this apparatus is arranged to execute the function diagnosis by setting the inner space of the fuel purge line into a positive pressure, the pressure of the fuel purge line is not radically decreased and excessive stress is not applied to the line of the evaporative emission control system. Therefore, there is no fear of the deformation of the line.

What is claimed is:

1. An apparatus for diagnosing an evaporative emission control system for an internal combustion engine, said apparatus comprising:
   - a fluid passage fluidly communicating a fuel tank and an intake passage of the internal combustion engine;
   - a canister disposed in said fluid passage and adsorbing fuel vapor generated in the fuel tank;
   - a purge cut valve disposed in said passage between said canister and the intake passage;
   - a vent cut valve connected to a fresh air inlet port of said canister;
   - a one way valve disposed in said fluid passage between the fuel tank and said canister so as to prevent negative pressure of the intake passage from being supplied to the fuel tank and to allow the fuel vapor to flow to said canister;
   - a bypass valve connected to said fluid passage between the fuel tank and said canister through a bypass passage so as to bypass said one way valve;
   - a valve control means for controlling open-and-close operations of said purge cut valve, said vent valve and said bypass valve;
   - a pressure detecting means for detecting pressure in said fluid passage between said purge cut valve and said canister; and
   - a diagnosing means for diagnosing function of said vent cut valve on the basis of first and second pressure values detected by said pressure detecting means, the first value being detected in a first condition that said fluid passage between said canister and the intake passage through said valve control means and the fresh air port are closed by closing said purge cut valve and said vent cut valve, the second pressure value being detected in a second condition that the bypass passage is temporally opened by opening said bypass valve through said valve control means.

2. An apparatus as claimed in claim 1, wherein said diagnosing means diagnoses a closing function of the vent cut valve, and detects one of sticking of the bypass valve in a closed condition, leakage of fuel vapor, sticking of the vent cut valve in an open condition, and no-vapor existence.

3. An apparatus as claimed in claim 1, wherein said purge cut valve is an ON-OFF valve which is closed when a throttle valve of the engine is fully closed and is opened when the throttle valve is opened.

4. An apparatus as claimed in claim 1, further comprising a purge control valve which is disposed in said fluid passage between said purge cut valve and the intake passage, said purge control valve being of a stepping motor control type and controlling a purge amount of fuel vapor stored in said canister.

5. An apparatus as claimed in claim 1, wherein said fluid passage includes a purging passage communicating said canister and the intake passage and a fuel vapor passage communicating the fuel tank and said canister.

6. An apparatus for diagnosing an evaporative emission control system for an internal combustion engine, said apparatus comprising:
   - a fluid passage fluidly communicating a fuel tank and an intake passage of the internal combustion engine;
   - a canister disposed in said fluid passage and adsorbing fuel vapor generated in the fuel tank;
   - a purge cut valve disposed in said fluid passage between said canister and the intake passage;
   - a vent cut valve connected to a fresh air inlet port of said canister;
   - a one way valve disposed in said fluid passage between the fuel tank and said canister so as to prevent negative pressure of the intake passage from being supplied to the fuel tank and allow the fuel vapor to flow to said canister;
   - a bypass valve connected to said fluid passage between the fuel tank and said canister through a bypass passage so as to bypass said one way valve;
   - a valve control means for controlling open-and-close operations of said purge cut valve, said vent cut valve and said bypass valve;
   - a pressure detecting means for detecting pressure in said fluid passage between said purge cut valve and said canister; and
   - a diagnosing means for diagnosing an opening function of said vent cut valve on the basis of a pressure value detected by said pressure detecting means in a condition that the fresh air inlet port is opened by opening said vent cut valve after said fluid passage between said canister and the intake passage and the fresh air inlet port are closed by closing the purge cut valve and the vent cut valve through said valve control means and the bypass passage is temporally opened by opening said bypass valve through said valve control means.

7. An apparatus for diagnosing an evaporative emission control system for an internal combustion engine, said apparatus comprising:
   - a fluid passage fluidly communicating a fuel tank and an intake passage of the internal combustion engine;
   - a canister disposed in said fluid passage and adsorbing fuel vapor generated in the fuel tank;
   - a purge cut valve disposed in said fluid passage between said canister and the intake passage;
   - a fresh air control valve connected to a fresh air inlet port of said canister;
   - a one way valve disposed in said fluid passage between the fuel tank and said canister so as to prevent negative pressure of the intake passage from being supplied to the fuel tank and to allow the fuel vapor to flow to said canister;
   - a bypass valve connected to said fluid passage between the fuel tank and said canister through a bypass passage so as to bypass said one way valve;

a valve control means for controlling open-and-close operations of said purge cut valve, said fresh air control valve and said bypass valve;

a pressure detecting means for detecting pressure in said fluid passage between said purge cut valve and said canister;

a first diagnosing means for diagnosing a closing function of said fresh air control valve on the basis of first and second pressure values detected by said pressure detecting means, the first value being detected in a first condition that said fluid passage between said canister and the intake passage and the fresh air inlet port are closed by closing the purge cut valve and the fresh air control valve, the second pressure value being detected in a second condition that the bypass passage is temporally opened by opening said bypass valve; and a second diagnosing means for diagnosing an opening function of said fresh air control valve on the basis of a third pressure value detected by said pressure detecting means in a condition that the fresh air inlet port is opened by opening said fresh air control valve after said first diagnosing mean executed the diagnosis of the closing function of said fresh air control valve.

8. An apparatus as claimed in claim 7, wherein said first diagnosing means diagnoses one of sticking of said bypass valve in a closed condition, leakage of fuel vapor, sticking of said fresh air control valve in an open condition and no vapor existence, in addition to the diagnosis of the closing function of said fresh air control valve.

* * * * *